United States Patent
Bonicatto et al.

(10) Patent No.: US 8,731,076 B2
(45) Date of Patent: May 20, 2014

(54) VARIABLE SYMBOL PERIOD ASSIGNMENT AND DETECTION

(75) Inventors: Damian Bonicatto, Pequot Lakes, MN (US); Stuart Haug, Hackensack, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 573 days.

(21) Appl. No.: 12/916,852

(22) Filed: Nov. 1, 2010

(65) Prior Publication Data

US 2012/0106664 A1    May 3, 2012

(51) Int. Cl.
*H04L 27/00*    (2006.01)

(52) U.S. Cl.
USPC ........................................ 375/260

(58) Field of Classification Search
USPC .................. 375/259, 260, 316, 295
See application file for complete search history.

(56) References Cited

U.S. PATENT DOCUMENTS

| | | | |
|---|---|---|---|
| 5,581,229 A | 12/1996 | Hunt | |
| 6,154,488 A | 11/2000 | Hunt | |
| 6,177,884 B1 | 1/2001 | Hunt et al. | |
| 6,608,552 B1 | 8/2003 | Fogel et al. | |
| 6,871,180 B1 * | 3/2005 | Neuhauser et al. | 704/500 |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,450,669 B2 | 11/2008 | Mori | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,769,105 B1 * | 8/2010 | McIntire et al. | 375/309 |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,238,263 B2 | 8/2012 | Kohout et al. | |
| 2007/0159981 A1 | 7/2007 | Chang et al. | |
| 2008/0143491 A1 * | 6/2008 | Deaver | 340/310.11 |
| 2008/0287155 A1 | 11/2008 | Xu et al. | |
| 2008/0304595 A1 | 12/2008 | Haug et al. | |

(Continued)

*Primary Examiner* — Kevin M Burd

(57) ABSTRACT

Methods, systems, and apparatus, including computer programs encoded on a computer storage medium, for dynamically selecting symbol periods for communications signals and recovering symbols from the communications signals. In one aspect, a method includes receiving a plurality of communications signals over a plurality of different communications channels and determining symbol period end times for the communications signals. A determination is made that a present time is coincident with an end of a sample period for the communications signals and that an end of the symbol period for the communications signals received over at least one of the communications channels is coincident with the present time. In turn, data are provided that represent a symbol received over each communications channel for which an end of the symbol period is coincident with the present time.

5 Claims, 6 Drawing Sheets

(56) References Cited

U.S. PATENT DOCUMENTS

| | | | |
|---|---|---|---|
| 2010/0046447 A1* | 2/2010 | Palanki et al. | 370/329 |
| 2011/0121952 A1 | 5/2011 | Bonicatto et al. | |
| 2011/0176598 A1 | 7/2011 | Kohout et al. | |
| 2011/0218686 A1 | 9/2011 | McHann, Jr. et al. | |
| 2011/0249678 A1 | 10/2011 | Bonicatto et al. | |
| 2012/0008590 A1* | 1/2012 | Novak et al. | 370/330 |
| 2012/0057592 A1 | 3/2012 | Zeppetelle et al. | |
| 2012/0076212 A1 | 3/2012 | Zeppetelle et al. | |
| 2012/0084559 A1 | 4/2012 | Bonicatto | |
| 2012/0106664 A1 | 5/2012 | Bonicatto et al. | |

\* cited by examiner

VARIABLE SYMBOL PERIOD ASSIGNMENT AND DETECTION

BACKGROUND

This specification relates to data communications.

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region and receive data back about the power usage.

These service providers are dependent on proper operation of their respective networks to deliver services to the customers and receive data back regarding the services provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, endpoints in the network (e.g., meters, load control switches, remote service switches, and other endpoints) can provide updated information (e.g., power consumption information and/or endpoint operating status information) by transmitting data over power lines. The amount of data required to be transmitted by each endpoint can differ based on the information that is required to be provided by the endpoint. For example, a first endpoint may be required to transmit updated information every 5 minutes, while another endpoint may be required to transmit updated information only once a day. Additionally, the channels over which the endpoints communicate can have various different channel characteristics (e.g., center frequency, bandwidth, and/or noise signal amplitude).

Due to the various amounts of data that may be transmitted by different endpoints, as well as the differences in channel characteristics, it can be difficult to select a single symbol period (i.e., a period over which a symbol is transmitted) that facilitates efficient transmission of data for each endpoint. Further, the channel characteristics can vary significantly over time such that symbol periods that are selected for the endpoints at one point in time may not provide adequate performance at another point in time.

SUMMARY

In general, one innovative aspect of the subject matter described in this specification can be embodied in methods that include the actions of receiving a plurality of communications signals over a plurality of different communications channels, each of the communications signals having a symbol period over which a symbol is transmitted; for each communications channel, determining symbol period end times for the communications signals received over the communications channels, each symbol period end time being determined based on a symbol period for the communications signals received over the communications channel and a reference time; determining that a present time is coincident with an end of a sample period for the communications signals, the sample period being a period that does not exceed a minimum symbol period for the communications signals; determining that an end of the symbol period for the communications signals being received over at least one of the communications channels is coincident with the present time; and providing data representing a symbol received over each communications channel for which an end of the symbol period is coincident with the present time. Other embodiments of this aspect include corresponding systems, apparatus, and computer programs, configured to perform the actions of the methods, encoded on computer storage devices.

These and other embodiments can each optionally include one or more of the following features. Methods can further include the action of accumulating energy from each of the communications signals over the sample period. Providing data representing the symbol can include providing, for each bit of the symbol, a magnitude of the energy accumulated for the bit over the sample period.

Accumulating energy from each of the communications signals comprises accumulating, over the sample period, energy received over each different portion of spectrum that is included in the communications channel, wherein each different portion of spectrum corresponds to one or more bits of the symbol.

Methods can further include the action of determining the sample period using the symbol periods for the communications signals. Determining the sample period can include the actions of identifying a shortest symbol period for the communications signals; and selecting the sample period to be a divisor of the shortest symbol period and all other sample periods for the communications signals received over any of the plurality of communications channels.

Methods can further include the action of selecting, for each communications channel, a symbol period for the communications signals received over the communications channel, the symbol period being selected based on a signal to noise measure for the communications signals that are received over the communications channel. Methods can further include the action of selecting a sample period for the communications signals, wherein selecting a symbol period comprises selecting a symbol period that is a multiple of the sample period.

Receiving a plurality of communications signals can include the actions of receiving first communications signals over a first communications channel, the first communications signals having a first symbol period; and receiving second communications signals over a second communications channel, the second communications signals having a second symbol period that is different than the first symbol period.

Determining that an end of the symbol period for the communications signals being received over at least one of the communications channels is coincident with the present time can include the actions of determining that the present time is coincident with an end of the first symbol period for the first communications signals; and determining that the present time is not coincident with an end time of the second symbol period for the second communications signals.

Providing data representing the symbol can include providing data representing a first symbol that was received over the first communications channel, the first symbol being represented by an amplitude of energy accumulated over the symbol period for the first communications signals.

Methods can further include the actions of accumulating energy from the second communications signal over one or more next sample periods; determining, at the end of each next sample period, whether the end of the symbol period for the second communications signals is coincident with the end of the next sample period; and providing data representing a second symbol received over the second communications channel at the end of the one or more next sample periods that is coincident with an end time of the second communications signals. Methods can further include the action of determining the present time based on an amount of elapsed time relative to the reference time.

Methods can further include the actions of receiving the reference time from a substation processing unit; and receiving, from a data store, symbol period end times for the communications signals. Methods can further include the actions of determining a first energy measure for first communications signals received over a first communications channel, the first energy measure being determined over one or more first symbol periods for the first communications signals; determining that the first energy measure for the first communications signals does not meet an energy measure threshold; and in response to determining that the first power measure does not meet the power measure threshold, adjusting the first symbol period based on the first power measure.

Particular embodiments of the subject matter described in this specification can be implemented so as to realize one or more of the following advantages. Symbols that are each transmitted for different periods of time can be recovered by a data processing apparatus. Endpoints that communicate with a single data processing apparatus can each be assigned a different symbol time. Symbols can be more reliably recovered from endpoints by increasing the symbol period for endpoints for which a signal to noise measure is lower than a threshold. Symbol periods can be dynamically adjusted to compensate for changes to signal characteristics.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
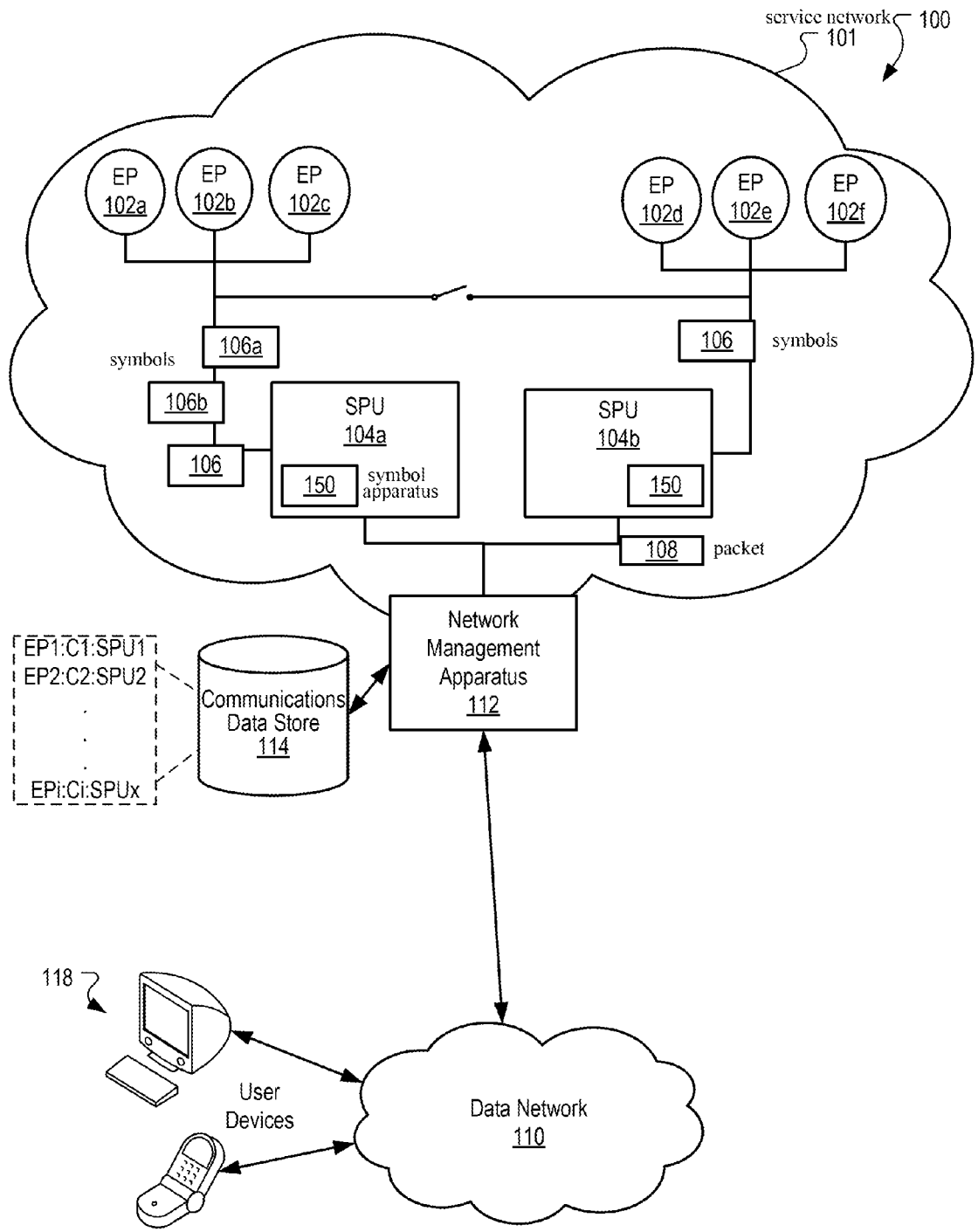
FIG. 1 is a block diagram of an example network environment in which endpoints transmit data.

A symbol period that is used by an endpoint for transmitting data over a power line communications system can be selected based on an amount of data to be transmitted by the endpoint and a signal to noise measure (e.g., Eb/No) for communications signals that are received from the endpoint over a channel (i.e., a portion of spectrum). The amount of data can be determined, for example, based on the updated meter information (e.g., power readings, voltage readings, meter operating status information, meter status information, and/or other information provided by the meter) that is being provided by the endpoint. The symbol period can also be selected, for example, based on an update rate (e.g., every 10 minutes, every hour) at which each new symbol is to be transmitted by the endpoint.

Different endpoints in the PLC network can be assigned different symbol periods and the symbol period for an individual endpoint can change over time. As described in more detail below, these different symbol periods specify different periods (e.g., amounts of time) over which energy of the symbol is accumulated prior to processing the symbol. Therefore, the times over which energy for symbols from each endpoint are collected prior to processing the symbol can differ.

As described in detail below, once a symbol period has been selected for the endpoint, signal characteristics (e.g., signal amplitude, signal to noise ratios, signal energy over time) of transmissions from the endpoint and/or the channel characteristics (e.g., noise floor measures or available bandwidth) can be continuously or periodically monitored, and different symbol periods can be dynamically selected for the endpoint in response to changes in the signal and/or channel characteristics.

A symbol apparatus receives symbols from multiple endpoints that may each transmit symbols over different symbol periods that can each span one or more sample periods. The symbol apparatus iteratively determines, at the end of each sample period, whether the end of the symbol period for each symbol is coincident with the end of a current specified time interval. If the end of the symbol period for a particular symbol is coincident with the end of the current sample period, the symbol apparatus can transfer the accumulated energy for the particular symbol to a data processing apparatus (e.g., a decoder) that processes the symbol (e.g., recovers and/or logs the symbol). However, if the symbol apparatus determines that the end of the unit interval for another symbol is not coincident with the end of the current specified interval, the symbol apparatus allows energy for the second symbol to continue to be accumulated at least until the end of a next specified interval.

The description that follows describes selection and detection of symbol periods by a symbol rate apparatus that is coupled to a network management apparatus. However, the symbol rate apparatus can be an integral component of the network management apparatus. Additionally, the symbol rate apparatus can also be implemented such that the symbol rate apparatus is coupled to (or is an integral component of) an endpoint or another data processing apparatus that receives, processes, and/or retransmits symbols that are received from other endpoints.

FIG. 1 is a block diagram of an example network environment 100 in which endpoints 102 transmit data. The network environment 100 includes a service network 101 in which a plurality of endpoints 102a-102f are coupled (e.g., communicatively coupled) to substation processing units 104a, 104b. The endpoints 102 can be any device capable of transmitting data in the network environment 100. For example, the endpoints 102 can be meters in a utility network, computing devices, television set top terminals or telephones that transmit data in the service network 101. The description that follows refers to the endpoints 102 as power meters in a power distribution network. However, the description that follows is applicable to other types of endpoints 102 in utility networks or other networks. For example, the description that follows is applicable to gas meters and water meters that are respectively installed in gas and water distribution networks.

The endpoints 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The endpoints 102 report the operating characteristics of the network 101 over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication networks that dynamically allocate available bandwidth according to an orthogonal frequency division multiple access (OFDMA) spectrum allocation technique or another channel allocation technique. (e.g., Time Division Multiple Access, Code Division Multiple Access, and other Frequency Division Multiple Access techniques).

When the endpoints 102 are implemented as power meters in a power distribution network, the power meters transmit reporting data that specify updated meter information that can include measures of total power consumption, power consumption over a specified period of time, peak power consumption, instantaneous voltage, peak voltage, minimum voltage and other measures of related to power consumption and power management (e.g., load information). Each of the power meters can also transmit status data that specify a status of the power meter (e.g., operating in a normal operating mode, emergency power mode, or another state such as a recovery state following a power outage).

In some implementations, symbols 106 (i.e., one or more bits) including the reporting and/or the status data are continuously or intermittently transmitted over a specified symbol period. A symbol period is a period of time over which a particular symbol is transmitted. A symbol period for each symbol transmitted by a power meter can be less than or equal to the time interval (i.e., 1/update rate) at which updated meter information is required to be provided.

For example, assume that a particular meter is required to provide updated meter information every 20 minutes (i.e., the specified update rate for the meter). In this example, a meter can transmit a symbol representing at least a portion first set of updated meter information for twenty minutes, and then transmit another symbol representing a next set of updated meter information for a subsequent twenty minutes. The update rate for a meter can be specified by a network administrator based, for example, on types and amounts of updated meter information that are being received from the meter, preferences of a customer (e.g., a power company) to whom the data is being provided, and/or channel characteristics of the channel over which the data is being transmitted. An update rate of 20 minutes is used for purposes of example, but other update rates (e.g., 1 minute, 5 minutes, 10 minutes, 1 hour, or 1 day) can be used.

In FIG. 1, endpoints 102a-102c and 102d-102f transmit symbols 106 over communications channels to substation processing units 104a, 104b, respectively. A substation processing unit (SPU) is a data processing apparatus that receives communications from endpoints to manage the service network 101 or for transmission to a network management apparatus 112 and/or through a data network 110. For example, a SPU (e.g., 104a) can include a receiver that receives symbols (e.g., 106a, 106b) from endpoints (e.g., 102a-102c) and logs data from the symbols. A SPU can also take action based on the data received from the endpoints and transmit the symbols to a network management apparatus 112 that manages the service network 101. SPUs 104a, 104b can transmit the individual symbols (e.g., 106a, 106b) or generate a consolidated packet 108 that includes data from multiple symbols 106 received from the endpoints 102a-102f.

In some implementations, a single SPU (e.g., 104a) can be configured to receive symbols 106 from thousands of endpoints and transmit the symbols 106 to a network management apparatus 112. A network management apparatus 112 is a data processing apparatus that processes communications that are received from SPUs 104a, 104b and/or controls aspects of the service network based, at least in part, on information extracted from the symbols 106 that were received from the SPUs 104a, 104b.

For example, in a PLC network, the network management apparatus 112 can receive data indicating that power usage is significantly higher in a particular portion of a power network than in other portions of the power network. Based on this data, the network management apparatus 112 can allocate additional resources to that particular portion of the network (i.e., load balance) or provide data specifying that there is increased power usage in the particular portion of the power network.

In some implementations, the network management apparatus 112 provides data to user devices 118 that can be accessed, for example, by the network operator, maintenance personnel and/or customers. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to the user device 118. Similarly, if there has been a power outage, the network management apparatus 112 can provide data to user devices 118 that are accessible by customers to provide information regarding the existence of the outage and potentially provide information estimating a duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only two SPUs 104a, 104b and one network management apparatus 112 are shown, the service network 101 can include many different SPUs that can each communicate with thousands of endpoints and many different network management apparatus that can each communicate with multiple SPUs.

Symbols (e.g., 106a, 106b) from a particular endpoint (e.g., 102a) may be transmitted over one of thousands of communications channels in a PLC system. For example, each endpoint can be assigned a particular channel using OFDMA or another channel allocation technique. Channel assignments for the endpoints 102a-102c, 102d-102f that communicate with particular SPUs 104a, 104b can be stored, for example, in an communications data store 114 that is accessible to the network management apparatus 112 and/or the SPUs 104a, 104b. For example, as illustrated in FIG. 1, the communications data store 114 can maintain an index of endpoints (e.g., EP1-EPi), the channel that each respective endpoint has been assigned (C1-Ci), and the SPU (e.g., SPU1-SPUx) that is responsible for receiving symbols transmitted by the respective endpoints.

A SPU can use the channel assignments, for example, to determine which endpoint transmitted symbols 106 are received over each of the communications channels. In turn, the SPU can log (i.e., store) the symbols 106 based on the identity of the endpoint that transmitted the symbols 106. For example, using the channel assignments, the SPU 104b can determine that the endpoint 102d has been assigned channel 1. In this example, when the SPU 104b receives symbol 106b over channel 1, the SPU 104b can log the symbol 106b in memory as a symbol for endpoint 102d.

When endpoints 102a-102f are installed in the service network 101, the endpoints 102a-102f can each be assigned a symbol period. The symbol period that is assigned to a particular endpoint can be selected, for example, based on signal characteristics (e.g., signal amplitude) of the communications signals that represent the symbols and are received at a SPU, relative to the amplitude of the noise floor that is present on the channel over which the communications signals are being received. For example, the symbol period can be selected so that the Eb/No accumulated over the unit interval for the endpoint exceeds a specified signal to noise threshold.

In some implementations, the symbol period that is selected for use by a particular endpoint is proportional to a distance of the endpoint from a SPU (or another data processing apparatus) that receives symbols from the endpoint. For example, as the distance between an endpoint and a SPU increases communications signals that are transmitted by the endpoint will generally be more attenuated. Therefore, assuming that the transmit power of the endpoint remains relatively constant, it will generally take longer to accumulate enough energy to recover symbols from communications signals that are transmitted by the endpoint as the distance between the endpoint and the SPU increases.

As noted above, the symbol period for each endpoint in the service network 101 can be assigned by the administrator of the network. For example, when the endpoint is installed in the network 101, the endpoint can be configured to transmit symbols over an initial symbol period. The symbol period can also be specified by a SPU with which the endpoint communicates and/or network management apparatus 112. For example, the SPU or the network management apparatus 112 can analyze signal characteristics of communication signals that are received from the endpoint and transmit data to the endpoint specifying a symbol period that the endpoint should use to reliably transmit symbols over the service network 101.

The data specifying the symbol period that the endpoint should use can be iteratively provided to the endpoint to dynamically adjust the symbol period used by the endpoint. For example, if the amplitude of the noise floor for the channel over which the endpoint is transmitting communication signals increases, the reliability with which the symbols are recovered can fall. Increasing the symbol period that the endpoint uses will increase the likelihood that the symbol is reliably recovered from the communications signals because the amount of energy accumulated generally increases with an increase in symbol period.

Each endpoint can be independently assigned a symbol period, such that different endpoints may transmit symbols over different symbol periods. For example, endpoint 102a may transmit each symbol over a 5 minute unit interval, while endpoint 102b may transmit each symbol over a 20 minute unit interval. Once an endpoint is assigned a symbol period, the symbol period can be stored in the communications data store 114 and indexed to (i.e., associated with) the endpoint and/or the channel over which the symbols from the endpoint are received.

The network management apparatus 112 and/or the SPUs 104a, 104b can access the communications data store 114 to identify the symbol period that has been assigned to the endpoint. Using the symbol period, the SPUs 104a, and 104b can determine how long energy from each of the endpoints should be accumulated in order to recover the symbol 106 being transmitted by the endpoint.

As described in more detail with reference to FIG. 3, each SPU can include a symbol apparatus that determines, for each channel, times at which symbol periods for each endpoint are ending and cause energy being received from the endpoint to be accumulated until the end of the symbol period for the endpoint. Continuing with the example above, the symbol apparatus 150 for SPU 104a can cause energy for the symbol 106a that is received from endpoint 102a to be accumulated for 5 minutes, since the symbol period for endpoint 102a is 5 minutes. Similarly, the symbol apparatus for SPU 104a can accumulate energy for the symbol 106b received from endpoint 102b over 20 minutes since the symbol period for endpoint 102b is 20 minutes.

Figure 2:
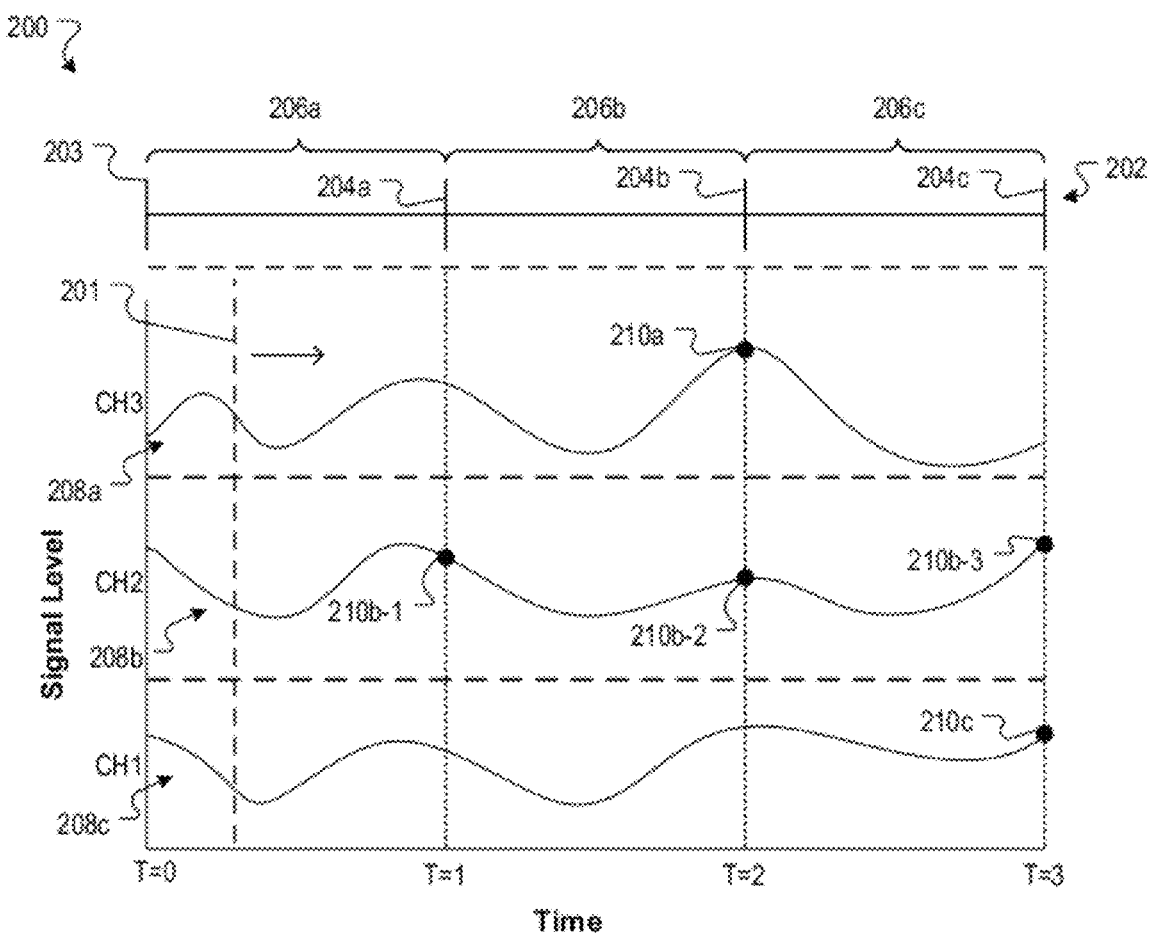
FIG. 2 is a graph illustrating times at which symbols from various channels are sampled.

FIG. 2 is a graph 200 illustrating communications signals that have different symbol periods. The graph includes a present time indicator 201 and a sample period indicator 202. The sample period indicator 202 includes a start sample tick 203 at t=0, and sample ticks 204a-204c, which each represent respective sample period end times (e.g., t=1, t=2, and t=3) for sample periods 206a-206c. Each of the sample periods 206a-206c is a period during which communications signals are accumulated over the communications channels 208a-208c. For example, as the present time elapses from the start tick 203 to the sample tick 204a (e.g., from t=0 to t=1), energy from communications signals received over communications channels 208a-208c will be continually (or periodically) accumulated.

When the present time is coincident with the end of the sample period 208a (i.e., when the present time reaches t=1, which is the sample period end time for the sample period 208a, as represented by the sample tick 204a), the symbol apparatus 150 determines whether the present time is also coincident with symbol period end times 210a-210c for any of the communications channels 208a-208c (i.e., for communications signals that are received over the respective communications channels).

For example, at t=1, the symbol apparatus 150 can compare the present time t=1 to the symbol period end times 210a-210c for each of the communications channels 208a-208c. This comparison will reveal that communications channel 208b has a symbol period end time 210b-1 that is coincident with the present time, but that the other communications channels 208a and 208c do not have symbol period end times that are coincident with the present time. Thus, at t=1, the symbol apparatus 150 will provide for further processing, the energy from channel 208b that has been accumulated over the first sample period 206a, but will not provide the energy that was accumulated from channel 208a or 208c. The energy from communications signals received over channel 208b can be provided to a data processing apparatus that recovers a symbol from the accumulated energy. For example, the accumulated energy can be provided to a data processing apparatus that demodulates the accumulated energy to recover encoded data.

As the present time advances from t=1 to t=2, energy from communications received over all of the communications channels 208a-208c will continue to be accumulated.

Because the accumulated energy from channel 208*b* was provided at time t=1, the accumulated energy for channel 208*b* can be reset to a reference energy value (e.g., energy=0), such that at t=2 the accumulated energy for channel 208*b* (i.e., relative to the reference energy value) will be only the energy that was accumulated over the second sample period 206*b*. Since the accumulated energy from communications channels 208*a* and 208*c* were not provided at the end of the first sample period 206*a* (i.e., at t=1), the energy that is accumulated for each of these channels over the second sample period will be aggregated (e.g., summed) with the energy that was accumulated over the first sample period 206*a*.

When the present time is coincident with the end of the second sample period 206*b* (i.e., when the present time reaches t=2, which is the sample period end time for the second sample period, as represented by sample tick 204*b*), the symbol apparatus 150 again determines whether the present time t=2 is coincident with the symbol period end times 210*a*-210*c* for the communications channels 208*a*-208*c* (i.e., for communications signals that are received over the respective communications channels).

For example, at t=2, the symbol apparatus 150 can determine that the communications channels 208*a* and 208*b* each has a symbol period end time 210*a* and 210*b*-2, respectively, that is coincident with the present time t=2, but that 208*c* does not have symbol period end time that is coincident with the present time. Thus, at t=2, the symbol apparatus 150 will provide, for further processing (e.g., symbol recovery), the energy from channel 208*a* that has been accumulated from communications signals received over both the first sample period 206*a* and the second sample period 206*b* as well as the energy that was accumulated from communications signals received over channel 208*b* during the second sample period 206*b*. However, the symbol apparatus 150 will not provide the energy that was accumulated from communications signals received over channel 208*c*. Once the accumulated energy for channels 208*a* and 208*b* are provided, the symbol apparatus 150 can set the accumulated energy for channels 208*a* and 208*b* to the reference energy value (e.g., energy=0), and continue to accumulate energy from communications signals that are received over all of the channels 208*a*-208*c*.

When the present time reaches t=3 (i.e., is coincident with the end of the third sample period 206*c*), the symbol apparatus 150 can determine which of the communications channels has a symbol period end time that is coincident with the end of the sample period (and the present time), as described above. For example, at the end of the third sample period 206*c*, the symbol apparatus 150 can determine that channels 208*b* and 208*c* each have a symbol period end time 210*b*-3 and 210*c*, respectively, that is coincident with the end of present time t=3. Based on this determination, the symbol apparatus 150 can provide the energy that was accumulated from communications signals received over channel 208*b* during the third sampler period 206*c*. The symbol apparatus 150 can also provide the energy that was accumulated from communications signals received over channel 208*c* during the first, second, and third sample periods 206*a*-206*c*.

As noted above, a single SPU can receive symbols from thousands of different endpoints in a network and over thousands of different channels. Also noted above, symbols being received over each different channel can have a different symbol period. Therefore, a symbol apparatus 150 can be configured to determine, for thousands of different channels and at the end of each sample period, which channels have symbol period end times that are coincident with the end of the present time, and provide the energy accumulated from these symbols for further processing.

Figure 3:
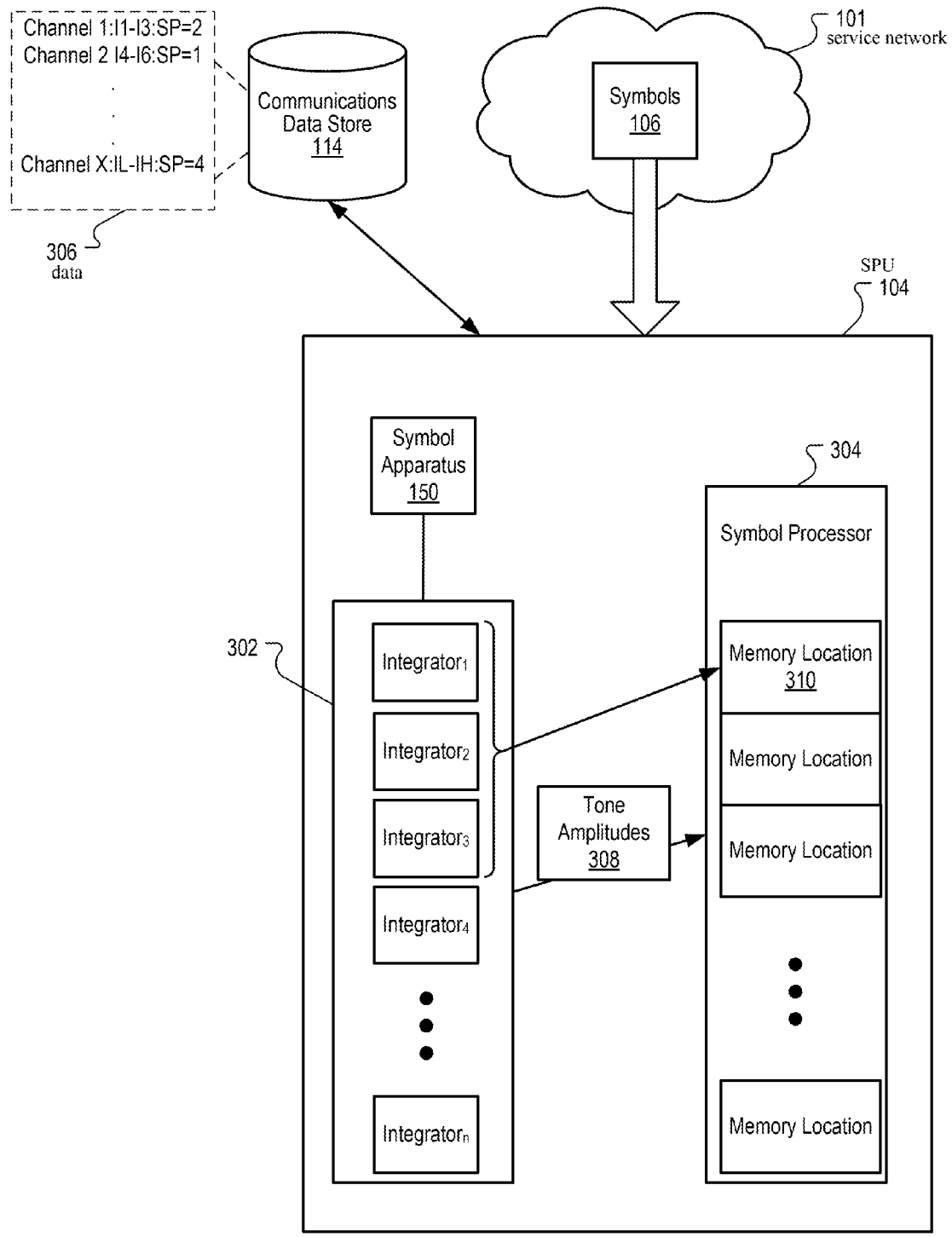
FIG. 3 is a block diagram of an example SPU that includes a symbol apparatus.

FIG. 3 is a block diagram of an example SPU 104 that includes a symbol apparatus 150. The symbol apparatus 150 is coupled to integrators 302 that accumulate energy for symbols 106 (i.e., as represented by communications signals) that are transmitted over the channels, as described below. The symbol apparatus 150 monitors the present time, and when the present time is coincident with the end of a sample period, determines whether the end of a symbol period for any of the symbols 106 being received from the service network 101 is coincident with the end of the sample period. When the symbol period end time for a symbol is coincident with the present time, the symbol apparatus causes the integrators 302 that have been accumulating the energy for the symbol to provide the accumulated energy to a symbol processor 304 that recovers the symbol.

In some implementations, each integrator 302 accumulates energy that is received over one specified portion of spectrum, which is referred to as a tone or a sub-channel. Each symbol is represented by communications signals that are transmitted over one or more tones, and the set of tones over which the communications signals that represent the symbol are transmitted is referred to as the channel over which the symbol is transmitted and/or received. The tones that define a particular channel can be allocated using OFDM or another spectrum allocation technique, as described above, and a channel need not be defined by a set of contiguous tones.

The tones that define each channel and the integrators that accumulate energy for these tones can be stored in the communications data store 114 and indexed according to the channel and/or the endpoint from which symbols 106 will be received. For example, the communications data store 114 can include data 306 specifying that integrators 1-3 (i.e., I1-I3) have been assigned to accumulate energy received over the tones that define channel 1, while integrators 4-6 (i.e., I4-I6) have been assigned to receive accumulate energy received over the tones that define channel 2.

The data 306 can also include data specifying symbol periods for symbols being received over each of the communications channels. A symbol period can be specified, for example, as an amount of time over which the symbol period spans (e.g., 10 minutes). The symbol period can also be specified as a quantity of sample periods over which the symbol period spans. For example, the symbol period associated with (i.e., indexed according to) channel 1 is expressed as 2 (i.e., SP=2 in FIG. 3), indicating that the symbol period for symbols received over channel 1 is 2 sample periods.

In some implementations, the symbol period end times for each symbol period can be stored in the communications data store 114. For example, a reference time (e.g., 12:00 am) can be specified, and the symbol period (or symbol rate) can be used to determine symbol period end times for each of the communications channels (e.g., 12:10 am, 12:20 am . . . 11:50 pm, 12:00 am).

The symbol apparatus 150 can access or otherwise obtain the data 306, and use the data 306 to cause the integrators 302 to provide accumulated energy for each channel at the end of the symbol periods associated with the respective channels. For example, if the symbol period for symbols received over channel 1 is expressed as being 2 sample periods, the symbol apparatus 150 can cause the integrators that accumulate energy for channel 1 (e.g., Integrator1, Integrator2, and Integrator3) to provide the accumulated energy and/or tone amplitudes 308 (i.e., data specifying an amplitude of the accumulated energy each tone in a set of one or more tones) to the symbol processor 304 at the end of every other sample period. The symbol processor 304 can store the accumulated energy and/or the tone amplitudes 308 in one or more memory locations 310 that are associated with channel 1, and, in turn, decode the symbol using the accumulated energy and/or tone amplitudes 308.

Figure 4:
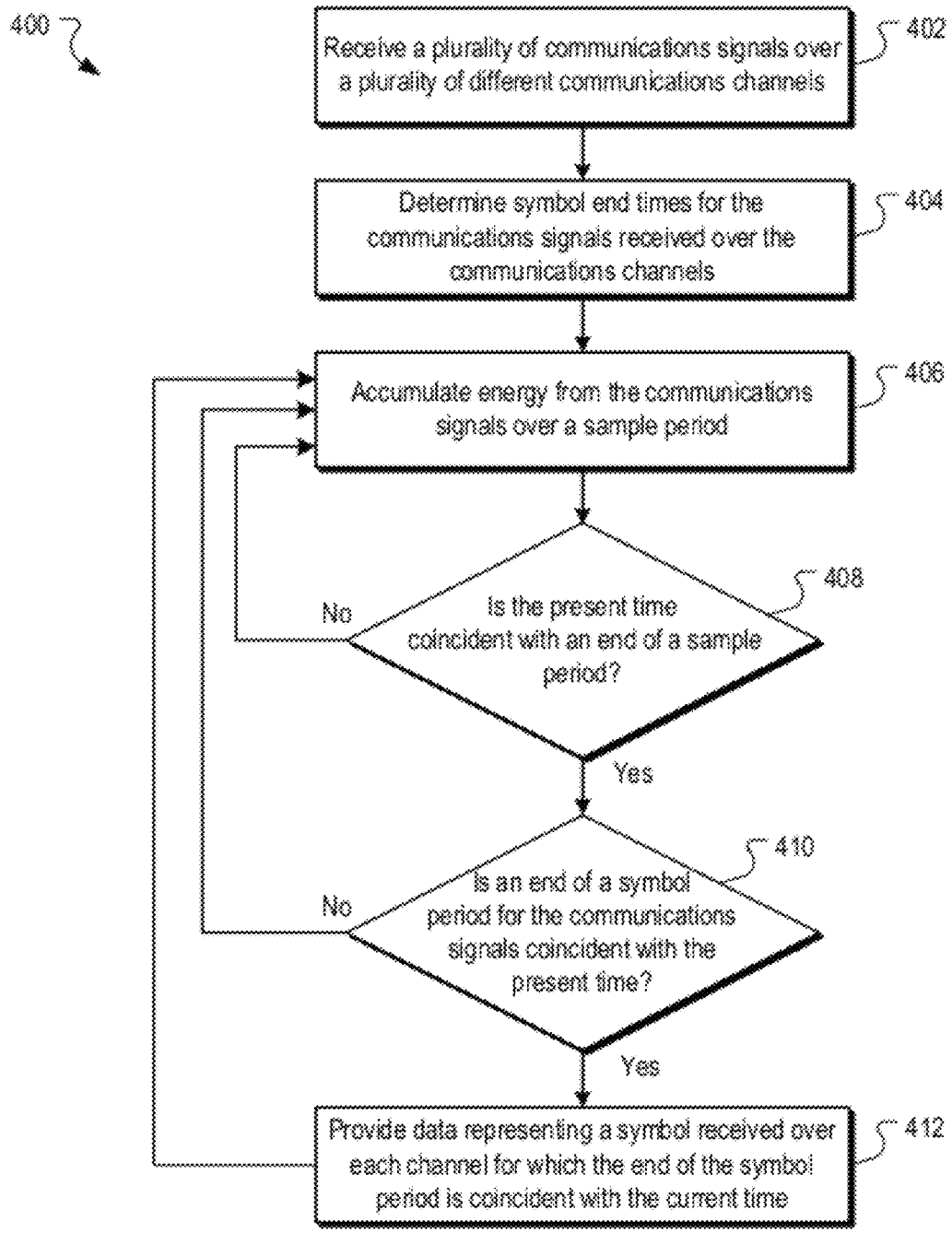
FIG. 4 is a flow chart of an example process for acquiring symbols that have different symbol periods.

FIG. 4 is a flow chart of an example process 400 for acquiring symbols that have different symbol periods. The process 400 is a process by which symbol period end times are determined for communications signals that are received over different communications channels. Energy for the communications signals are accumulated over a sample period. At the end of the sample period a determination is made whether an end of a symbol period for any of the communications signals is coincident with the end of the sample period (and/or the present time). Energy continues to be accumulated for communications signals that do not have a symbol period end time that is coincident with the end of the sample period (and/or the present time), while data that represent a symbol are provided for communications signals that have a symbol period end time that is coincident with the end of the sample period (and/or the present time).

The process 400 can be implemented, for example, by the symbol apparatus 150, the SPU 104, and/or the network management apparatus 112 of FIG. 1. In some implementations, the symbol apparatus 150 is a data processing apparatus that includes one or more processors that are configured to perform actions of the process 400. In other implementations, a computer readable medium can include instructions that when executed by a computer cause the computer to perform actions of the process 400.

A plurality of communications signals are received over a plurality of different communications channels (402). In some implementations, communications signals that are received over each different channel have a symbol period over which a symbol is transmitted over the channel. As described in more detail with reference to FIG. 5, the symbol period for the communications signals that are transmitted over the channel can be selected, for example, based on a signal to noise measure (e.g., measured at a receiving apparatus, such as a SPU) for the signals that are received over the channel.

Signal to noise measures can vary on a channel by channel basis, for example, based on distance of an endpoint from a SPU. Therefore, symbol periods can vary on a per-channel basis. For example, first communications signals (e.g., from a first SPU) can be received over a first communications channel, while second communications signals (e.g., from a second SPU) can be received over a second communications channel (e.g., that is different from the first communications channel). In this example, the first communications signals (e.g., signals received over channel 208a of FIG. 2) may have a different symbol period than the second communications signals (e.g., signals received over channel 208c of FIG. 2). Therefore, the times at which communications signals representing the symbols received over the first communications channel are logged or provided for additional processing will differ from the times at which communications signals representing the symbols received over second communications channel are logged or provided for further processing.

Symbol period end times are determined for communications signals that are received over each of the communications channels (404). In some implementations, each symbol period end time is determined based on a symbol period for the communications signals received over the communications channel and a reference time.

The reference time is a time from which symbol periods, sample periods, symbol period end times, sample period end times, the present time, and/or other times are determined or measured. For example, the reference time can be set to be 12:00 am Greenwich Mean Time ("GMT"), such that present time can be determined as an amount of time that has elapsed since 12:00 am GMT (i.e., the present GMT). Similarly, in this example, the sample period end times can be determined by using the reference time as the start time for the first sample period, and setting the GMT time at which each sequential sample period ends as a sample period end time. Symbol period end times can also be determined in a similar manner as sample period end times.

The reference time can be received, for example, from a substation processing unit. For example, the substation processing unit can periodically transmit a signal to the endpoints indicating that the present time is coincident with the reference time. In this example, each endpoint can then begin transmitting symbols at the reference time and proceed to transmit a next symbol when the present time is coincident with the end of the symbol period for the symbol. The reference time can also be received from other devices, such as a device that is part of a Global Positioning System or a device that is capable of receiving WWV broadcasts from the National Institute of Standards and Technology.

In some implementations, each of the endpoints can use a timing reference to ensure that any timing drift is maintained within a drift threshold. For example, in a PLC network, the endpoints can use the 60 Hz power as a timing reference (e.g., phase lock to a 60 Hz reference). As described above, the symbol period end times can be stored in a data store, and retrieved or otherwise obtained by a SPU or another data processing apparatus.

Energy is accumulated from the communications signals over a sample period (406). The energy can be independently accumulated for each different portion of spectrum (i.e., each tone) that is included in each communications channel. For example, as described above with reference to FIG. 3, a different integrator can be used to accumulate energy that is received over each tone. In some implementations, the energy that is received over each tone during the sample period corresponds to the magnitude of one or more bits of the symbol that is being transmitted by an endpoint.

A sample period is a period of time over which communications signals are accumulated. In some implementations, the sample period is a period that does not exceed a minimum symbol period for the communications signals and can be determined using the symbol periods for the communications signals. For example, the sample period can be set equal to a minimum period (i.e., a shortest symbol period) over which a symbol is transmitted over one of the communications channels.

The sample period can be specified, for example, by a network administrator or determined by a data processing apparatus that selects a sample period having sample period end times that are coincidental with each symbol period end time for symbols received over the communications channels. In some implementations, the sample period is selected to be a period that is a divisor of the shortest symbol period and all other sample periods for the communications signals that are received over the communications channels. In some implementations, the sample period can be selected and then used to select symbol periods for the communications signals, where the symbol periods are each a multiple of the sample period (e.g., 1×sample period or 2×sample period).

It is determined whether the present time is coincident with an end of a sample period for the communications signals (408). In some implementations, the present time is compared to sample period end times to perform the determination. For example, a set of sample period end times can be maintained, and compared to the present time. When the present time matches a sample period end time, it is determined that the present time is coincident with the end of a sample period. A counter that is phase locked with the 60 Hz line (e.g., one phase of the 60 Hz line) can also be used to provide a signal to the symbol apparatus when the end of a sample period is reached. When the end of a sample period is not coincident with the present time, energy continues to be accumulated (406).

In response to determining that that the present time is coincident with the end of a sample period, it is determined whether an end of a symbol period for communications signals received over at least one of the channels is coincident with the present time (410). As described above, communications signals that are received over two different communications channels can have two different symbol periods, such that the symbol period end times may differ. Therefore, the present time may be coincident with a symbol period end time for communications signals that are received over one channel, while not being coincident with another symbol period end time for other communications signals that are received over another communications channel.

With reference to the example above, assume that the first communications signals (e.g., signals received over channel 208a of FIG. 2) and second communications signals (e.g., signals received over channel 208c of FIG. 2) are respectively received over two different communications channels. In this example, it may be determined that the present time is coincident with the end of the first symbol period for the first communications signals, while not being coincident with the end of the second symbol period for the second communications signals. Energy continues to be accumulated (406) over one or more next sample periods for communications signals that do not have a symbol period end time that is coincident with the end of the sample period (or the present time) and the determination can be iteratively made after each of the sample periods.

Data are provided representing a symbol received over each communications channel for which it is determined that an end of the symbol period is coincident with the present time (412). In some implementations, the data that are provided are data that represent magnitudes of the one or more bits (e.g., tone magnitudes) that are received over each tone of the channels, as described above with reference to FIG. 3.

Continuing with the example above, the data that are provided in response to determining that the end of the first symbol period is coincident with the end of the sample period (or the present time), data representing the amplitude of energy that was accumulated over the symbol period (and potentially previous symbol periods), can be provided to a data processing apparatus that can decode or otherwise recover the symbol.

Figure 5:
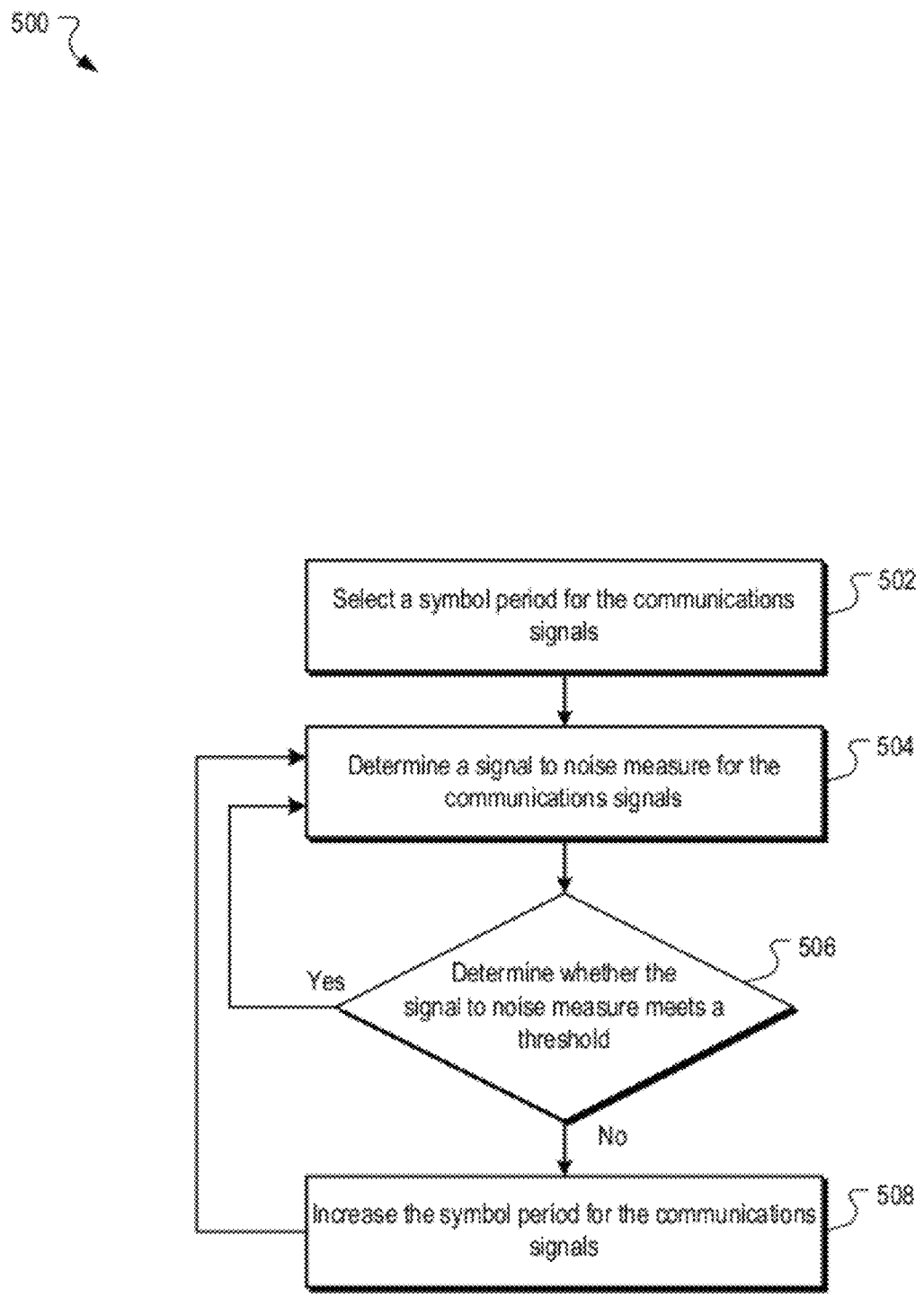
FIG. 5 is a flow chart of an example process for dynamically adjusting a symbol period for communications signals.

FIG. 5 is a flow chart of an example process 500 for dynamically adjusting a symbol period for communications signals. The process 500 is a process by which an initial symbol period is selected for the communications signals. A determination is made whether a signal to noise measure (or another energy measure) for the communications signals meets an energy measure threshold. When the signal to noise measure meets the threshold, the symbol period can remain the same and the signal to noise measure can continue to be monitored. When the signal to noise measure does not meet the threshold, the symbol period can be adjusted (e.g., increased), and the signal to noise measure can continue to be monitored. This process can iteratively continue to maintain or increase the likelihood that symbols are reliably recovered from the received communications signals.

The process 500 is described with reference to increasing symbol periods. However, a similar process can be used to decrease symbol periods when the accumulated energy exceeds a maximum threshold. Thus, the accumulated energy for each channel can be maintained in a specified range by dynamically adjusting the symbol periods of the channels.

The process 500 can be implemented, for example, by the symbol apparatus 150, the SPU 104, and/or the network management apparatus 112 of FIG. 1. In some implementations, the symbol apparatus 150 is a data processing apparatus that includes one or more processors that are configured to perform actions of the process 500. In other implementations, a computer readable medium can include instructions that when executed by a computer cause the computer to perform actions of the process 500.

An initial symbol period is selected for the communications signals (502). In some implementations, the initial symbol period is selected based on a distance over which the communications signals will be transmitted. For example, the initial symbol period can be selected to be directly proportional to a distance over which the communications signals are to be transmitted in a PLC network since signal losses increase as the distance increases. Alternatively, the initial symbol period can be selected to be directly proportional to the amplitude of a noise floor that has been measured on the communications channel over which the communications signals will be transmitted.

In some implementations, the initial symbol period used by endpoints to transmit communications symbols can be selected on a group basis, such that endpoints in a specified geographic region are configured to use a same initial symbol period, while endpoints in another geographic region are configured to use another initial symbol period. In these implementations, a distance of the geographic region to a device (e.g., a SPU) to which the communications symbols are being transmitted is used to select the initial symbol period that is used by the endpoints. Additionally, endpoints can be grouped based on modulation techniques used, a quantity of bits being encoded in each symbol, or using other characteristics.

A signal to noise measure is determined for the communications signals (504). The signal to noise measures can be determined by (or measured with) a SPU (or another device) that receives the communications signals. In some implementations, the signal to noise measure is determined by determining an energy measure for the first communications signals that are received over a communications channel over the initial symbol period. For example, the energy measure can be based on a magnitude of signal energy that has been accumulated from the communications signals over the initial symbol period. The energy measure can also be based on a measure (e.g., a magnitude) of the signal energy accumulated over the symbol period relative to a measure (e.g., magnitude) of the noise energy that was accumulated over the symbol period.

In some implementations, the signal to noise measure can be monitored over a single symbol period and/or multiple symbol periods. For example, the signal to noise measure can be an average (or another statistical measure) of the magnitude of the signal energy relative to the magnitude of the noise energy that has been accumulated over multiple symbol periods. The signal to noise measure can also be used to determine a signal to noise profile (e.g., distribution) that characterizes the signal to noise magnitude over multiple symbol periods.

It is determined whether the signal to noise measure meets an energy measure threshold (506). The energy measure threshold can be specified as an absolute signal energy magnitude or a relative signal energy magnitude (e.g., relative to the magnitude of the noise energy), such that the accumulated signal energy that is accumulated over one or more symbol periods can be compared to the threshold to determine whether the signal to noise measure meets (i.e., is equal to or greater than) the energy measure threshold. The energy measure threshold can also be specified using a signal to noise profile. For example, the energy measure threshold can be specified as a minimum signal energy magnitude that is within one standard deviation of an average signal energy magnitude.

When it is determined that the signal to noise measure meets the energy measure threshold, the signal to noise measure for the communications signals can continue to be determined (504) and monitored.

When it is determined that the signal to noise measure does not meet the energy measure threshold, the symbol period for the communications signals can be increased (508). In some implementations, the symbol period is increased a default amount (e.g., by a factor of 2 or by a single sample period) and the signal to noise measure is again determined (504). In these implementations, the signal to noise measure is iteratively increased by the default amount until the signal to noise measure meets the energy measure threshold.

In some implementations, the symbol period can be increased based on a magnitude by which the energy measure threshold exceeds the signal to noise measure. For example, the amount of additional time that will be required to increase the signal to noise measure to a magnitude that meets (or exceeds) the energy threshold can be computed using the signal to noise measure that was determined during one or more previous symbol periods.

Figure 6:
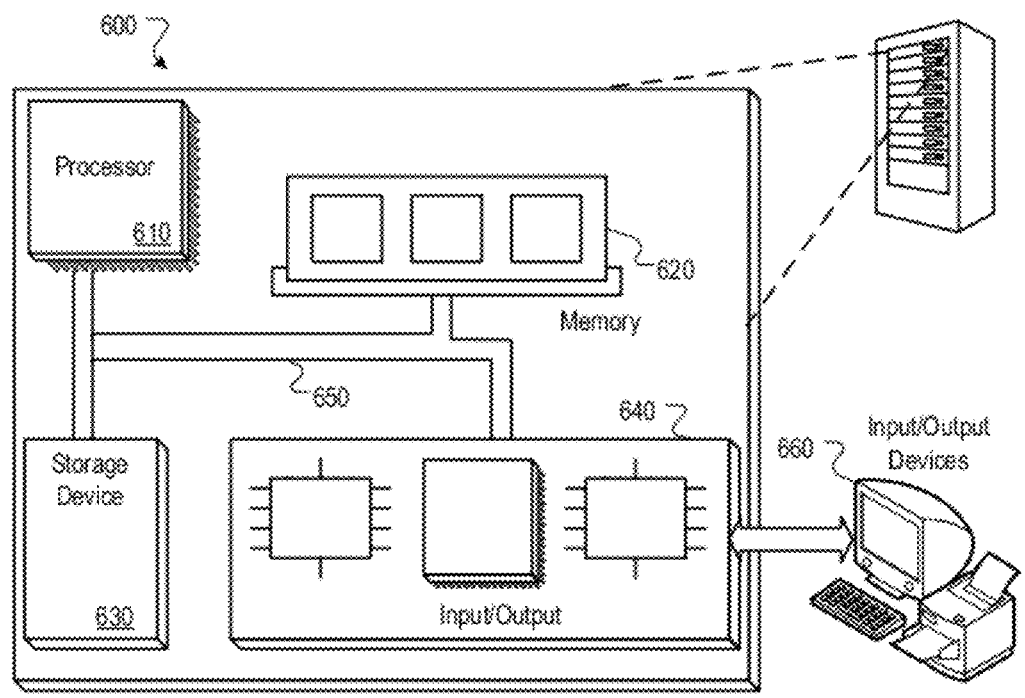
FIG. 6 is block diagram of an example computer system that can be used to facilitate variable symbol period assignment and detection.

FIG. 6 is block diagram of an example computer system 600 that can be used to facilitate variable symbol period assignment and detection, as described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving from different endpoints, respectively, a plurality of communications signals over a plurality of different communications channels, each of the communications signals having a symbol period over which a symbol is transmitted, wherein each of the different endpoints is assigned a different symbol period during which symbols are transmitted;
   for each communications channel, determining symbol period end times for the communications signals received over the communications channels, each symbol period end time being determined based on a symbol period for the communications signals received over the communications channel and a reference time;

determining that a present time is coincident with an end of a sample period for the communications signals, the sample period being a period that does not exceed a minimum symbol period for the communications signals;

determining that an end of the symbol period for the communications signals being received over at least one of the communications channels is coincident with the present time;

providing data representing a symbol received over each communications channel for which an end of the symbol period is coincident with the present time;

determining the sample period using the symbol periods for the communications signals; and wherein determining the sample period comprises:
identifying a shortest symbol period for the communications signals; and
selecting the sample period to be a divisor of the shortest symbol period and all other sample periods for the communications signals received over any of the plurality of communications channels.

2. The method of claim 1, further comprising:
selecting, for each communications channel, a symbol period for the communications signals received over the communications channel, the symbol period being selected based on a signal to noise measure for the communications signals that are received over the communications channel.

3. The method of claim 2, further comprising selecting a sample period for the communications signals, wherein selecting a symbol period comprises selecting a symbol period that is a multiple of the sample period.

4. A system comprising:
a plurality of endpoints that are configured to transmit communications signals over a plurality of different communications channels, wherein the plurality of endpoints are configured and arranged to send power-meter reports over a power line;

a data processing apparatus that is configured to interact with the plurality of endpoints and to:
receive the communications signals over the plurality of different communications channels, each of the communications signals being communicated in one of a plurality of symbol periods assigned for communication by one of the plurality of endpoints over which a symbol is transmitted, the symbol being represented by the communications signals;
for each communications channel, determine symbol period end times for the communications signals received over the communications channels, at least two of the communications signals having different symbol periods;
determining that an end of the symbol period for the communications signals being received over at least one of the communications channels is coincident with a present time; and
providing data representing a symbol received over each communications channel for which an end of the symbol period is coincident with the present time, and wherein the data processing apparatus is further configured to select, for each communications channel, a symbol period for the communications signals received over the communications channel, the symbol period being selected based on a signal to noise measure for the communications signals that are received over the communications channel.

5. A system comprising:
a plurality of endpoints that are configured to transmit communications signals over a plurality of different communications channels, wherein the plurality of endpoints are configured and arranged to send power-meter reports over a power line;

a data processing apparatus that is configured to interact with the plurality of endpoints and to:
receive the communications signals over the plurality of different communications channels, each of the communications signals being communicated in one of a plurality of symbol periods assigned for communication by one of the plurality of endpoints over which a symbol is transmitted, the symbol being represented by the communications signals;
for each communications channel, determine symbol period end times for the communications signals received over the communications channels, at least two of the communications signals having different symbol periods;
determining that an end of the symbol period for the communications signals being received over at least one of the communications channels is coincident with a present time;
providing data representing a symbol received over each communications channel for which an end of the symbol period is coincident with the present time; and wherein the data processing apparatus is further configured to:
determine a first energy measure for first communications signals received over a first communications channel, the first energy measure being determined over one or more first symbol periods for the first communications signals;
determine that the first energy measure for the first communications signals does not meet an energy measure threshold; and
in response to determining that the first energy measure does not meet the energy measure threshold, adjust the first symbol period based on the first energy measure.

* * * * *